March 19, 1963 M. L. LINCOLN 3,081,535

FLUX APPLICATION

Filed Aug. 26, 1958 3 Sheets-Sheet 1

INVENTOR
MILAN L. LINCOLN
BY
Norman J. O'Malley
ATTORNEY

March 19, 1963 M. L. LINCOLN 3,081,535

FLUX APPLICATION

Filed Aug. 26, 1958 3 Sheets-Sheet 2

INVENTOR
MILAN L. LINCOLN
BY
Norman J. O'Malley
ATTORNEY

March 19, 1963

M. L. LINCOLN 3,081,535

FLUX APPLICATION

Filed Aug. 26, 1958

3 Sheets-Sheet 3

INVENTOR
MILAN L. LINCOLN
BY
Norman J. O'Malley
ATTORNEY 3,081,535
FLUX APPLICATION Milan L. Lincoln, Batavia, N.Y., assignor, by mesne assignments, to Sylvania Electric Products Inc., Wilmington, Del., a corporation of Delaware Filed Aug. 26, 1958, Ser. No. 757,292
3 Claims. (Cl. 29—495)

This invention relates to devices and processes for applying fluids to wet a surface and more specifically to devices and processes for applying fluid solder flux to a substantially planar surface such as a circuit board.

Assembly of electronic equipment through the use of circuit boards has led to the increased need for automatic soldering and automatic fluxing devices and processes. As a result attempts have been made to apply soldering flux to circuit boards by dipping, spraying and painting. Though these techniques function satisfactorily under certain conditions, uniform high speed production has been difficult to obtain.

One solution which has been attempted involved generation of a wave of solder flux through which the circuit boards are passed. This technique shows considerable promise; however, difficulty has been experienced in maintaining the necessarily close tolerances in wave height without resorting to relatively expensive pumping techniques and pressure controls.

Thus, it is an object of this invention to provide uniform flux wetting of a surface area to be soldered through the use of a wave of liquid flux whose crest amplitude may fluctuate between height limits relatively easy to maintain.

It is a further object of this invention to obtain a high degree of uniformity in flux coverage of a surface to be soldered.

It is a still further object of this invention to provide a coating of soldering flux on a circuit board at a rapid production rate.

Briefly considering one aspect of the invention wherein the above mentioned aims and objects may be achieved, solder flux is applied to a surface by forming a flux wave including a plurality of peaks and valleys of given average level with the longitudinal axes of said valleys lying parallel to a given direction and passing circuit boards in said given direction through said flux wave at said average level.

For a better understanding of the present invention, together with other and further objects, advantages and capabilities thereof, reference is made to the following disclosure and appended claims, in connection with the accompanying drawings in which:

Figure 2:
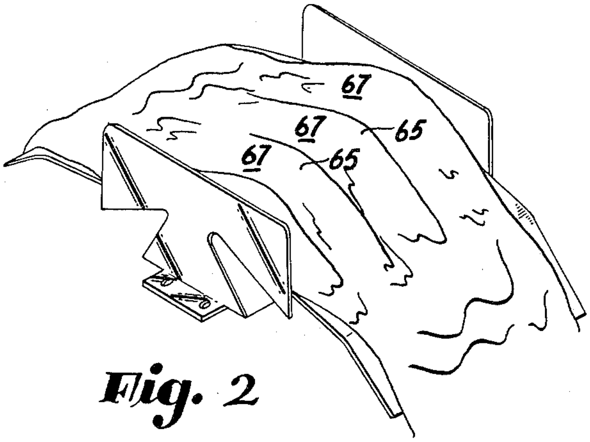
FIG. 2 shows a flux wave of preferred contour.

Though other structures may be used to achieve the aims and objects of the present invention well within the scope of the appended claims, one specific embodiment has been shown in the drawings in considerable detail.

Figures 1, 3:
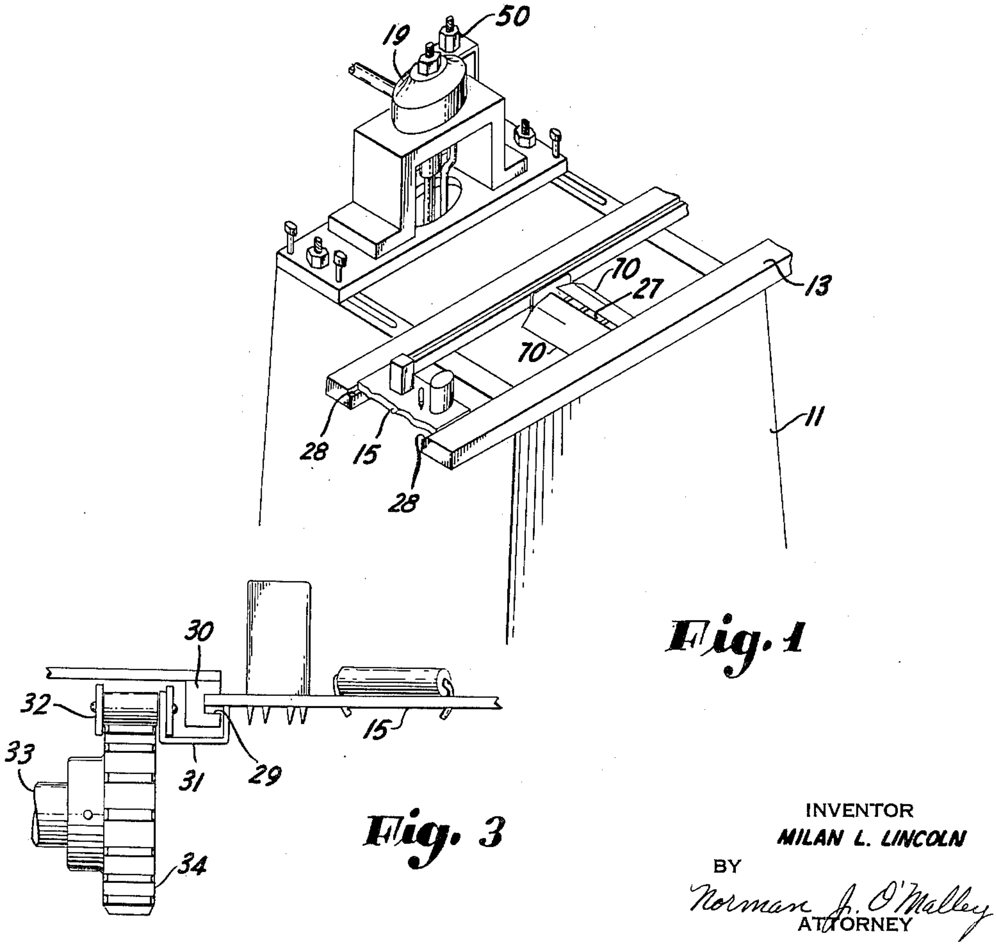
FIG. 1 shows a flux wave generator and circuit board support structure.
FIG. 3 shows one embodiment of a circuit board conveyor.
Figure 4:
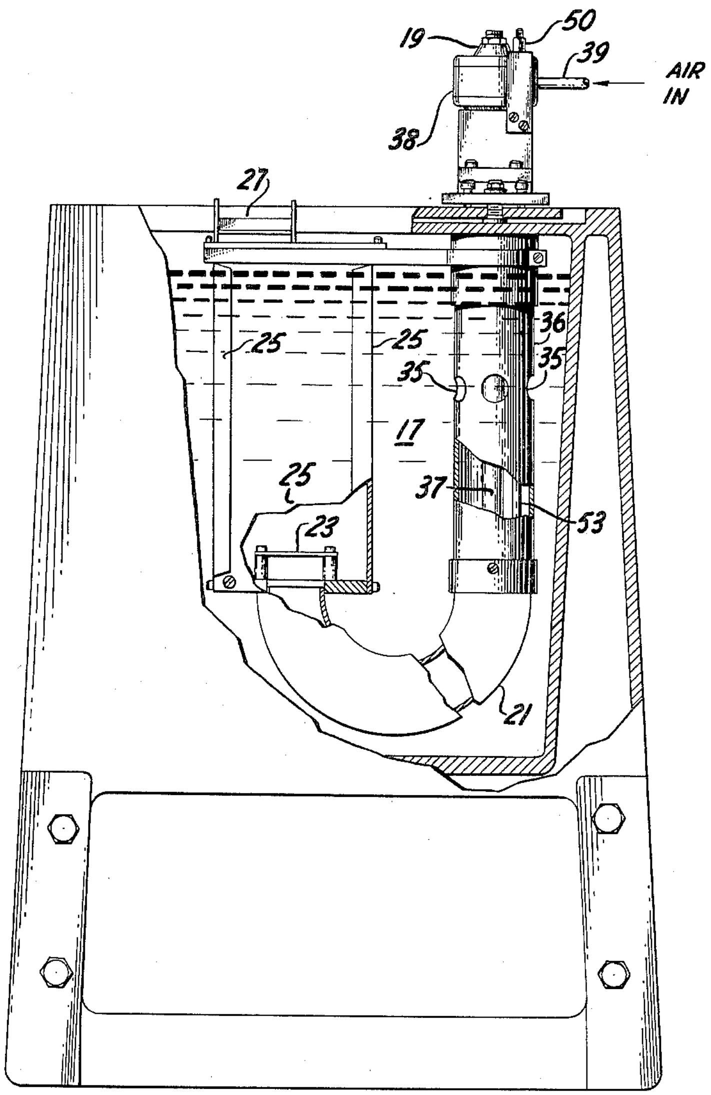
FIG. 4 shows the internal portion of a flux wave generating device.

Referring to the drawings, FIGS. 1 and 4, there is shown a support structure 11 for supporting guide tracks 13 over which circuit boards 15 are moved. Support 11 holds a liquid flux reservoir 17 from which liquid flux is pumped through the action of a pump 19 which may be of the air motor driven type. Pump 19 passes flux through a conduit 21 against a baffle 23 into a chamber including surrounding walls 25 up through a wave forming orifice 27.

The simple slides 28 in guide tracks 13, as shown in FIG. 1, require provision ahead of the fluxing station of a means for advancing the circuit boards over the flux wave. Such a means may not be available or desirable in some installations and, further, build up of dried flux in slides 28 may cause problems. These difficulties may be minimized by an integrally related direct drive conveying means capable of moving one board at a time over the flux wave in such a manner as to maintain the sliding surface of the guide track relatively free of dried flux.

A suitable direct drive structure is shown in FIG. 3 where it can be seen that circuit board 15 is retained, at least on one side, in a side opening U-shaped slot 29 in guide track 30. Guide track 30 may be supported beneath a plate attached to frame 11 in the same position relative to orifice 27 as the guide tracks 13 shown in FIG. 1. The board is supported and advanced by one or more U-shaped brackets 31 attached to one side of a link belt or chain 32 driven by shaft 33 through sprocket 34. Shaft 33 is in turn rotated by either an electric motor or other type of rotational device, not shown.

It has proven desirable in one embodiment to support both sides of the circuit board 15 on similar driving means and sufficient brackets 31 may be provided so as to provide several support portions under each side of the circuit board. For example, if brackets 31 are mounted at each link at least two or three brackets will support each side of circuit board 15 even though the circuit board be relatively short. Then as sprocket 34 is rotated, driving the link chain 32, brackets 31 support and advance circuit boards 15 through and over the flux wave. Where a strong driving force proves necessary it may be desirable to provide the support portion of the brackets 31 with a sharp edge which slightly cuts into the circuit board. It will be noted that the force applied by bracket 31 lifts the circuit board up tight against the upper surface of slot 29 to provide a wiping action which effectively eliminates any buildup of dried flux which might slow down board movement.

Input of pump 19 is through apertures 35 in outer casing 36 through which flux passes down along a shaft 37 which is rotated by air motor 38 powered through a connecting hose 39 from a source of air, not shown.

Figure 5:
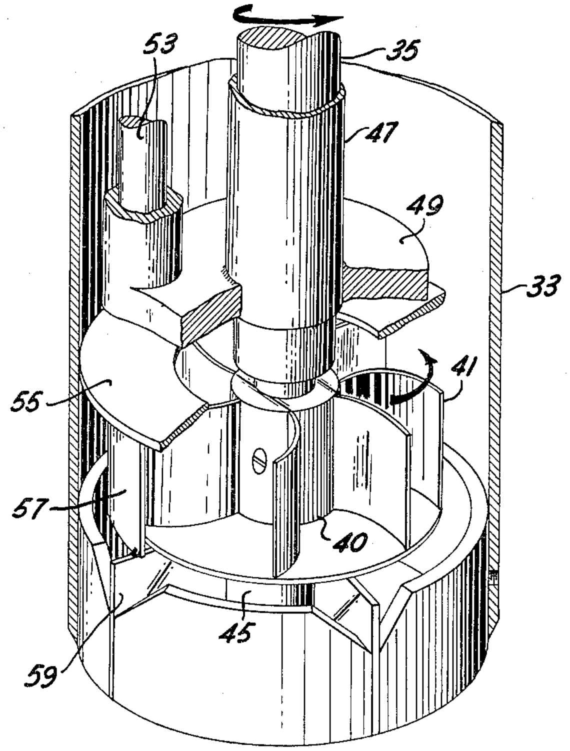
FIG. 5 shows the internal form of a flux pump.
Figure 6:
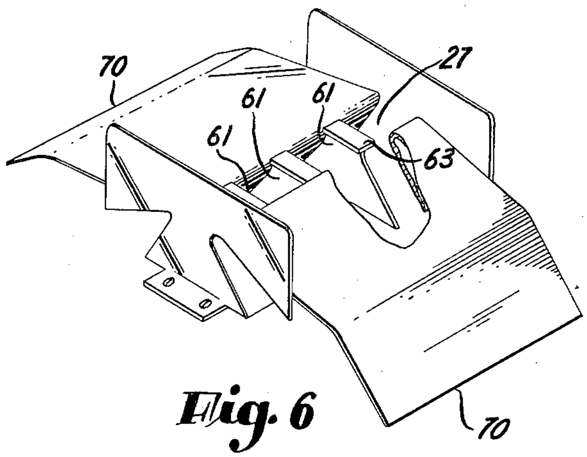
FIG. 6 shows a flux wave forming orifice and internal baffles.

Rotation of shaft 37, as best shown in FIG. 5, drives an impeller 40 including a plurality of concavo-convex blades 41. Shaft 37 is journaled to rotate in a lower bearing 45 and in an upper sleeve 47 to which is attached a valving ring comprising a slidable ring 49 of smaller diameter than casing 36. Ring 49 may be raised or lowered by raising or lowering attached rod 53 which is in threaded engagement with adjusting hex-nut 50.

A fixed ring 55 which has an outer diameter approximately equal to the inner diameter of casing 36 and a central aperture larger than shaft 37 is attached to a support baffle 57 which may enclose approximately 120° of the impeller. Support baffle 57 in turn is supported on side support plates 59 which also support the lower bearing 45.

As can be best seen in FIGS. 4 and 5, flux flows through outer casing orifices 35 down along the inner wall of casing 35 to ring 55. The amount of flux which may be drawn through the pump is governed by the spacing between ring 55 and ring 49 as adjusted by raising or lowering of shaft 53 through rotation of hex-nut 50. If this spacing is relatively large, a large amount of flux can flow above the upper surface of ring 55 and beneath ring 49 into the center portion of impeller 40. If the passage between rings 55 and 49 is made smaller then less flux can flow into the central portion of impeller 40, and the output of the pump and the height of the resultant flux wave are accordingly decreased.

Rotation of impeller 40 moves the flux trapped between adjacent concavo-convex plates 41 out toward the inner wall of casing 36. Since ring 55 blocks flux flow in an upward direction, the flux flows out and down under pressure through conduit 21 as previously explained.

The flux which flows up through orifice 27 due to the hydraulic pressure generated in pump 19 would tend to form a transverse wave having a uniform crest immediately above orifice 27 were it not for a plurality of baffles 61 included in orifice 27. However, baffles 61 with their upper horizontal plates 63 tend to deflect the flux forced through orifice 27 so as to form a plurality of flux waves somewhat as shown in FIG. 2. The resulting flux wave includes a plurality of peak portions 65 separated by valley portions 67. The longitudinal axes of the valleys are parallel to each other and they are also parallel to supporting guide tracks 13 over which circuit boards 15 are moved. Overflow flux returns to reservoir 17 over return aprons 70 which are shaped to afford a smooth overflow path to avoid splashing or other turbulence.

The flux wave is adjusted by controlling the amount of flux pumped by pump 19 so that the average flux wave level lies in the plane of the lower surface of circuit board 15 as it passes over orifice 27. In other words, the peaks of the flux wave are higher than the lower surface of circuit board 15 and the valleys of the flux wave are lower than the lower surface of circuit board 15. As a result when the circuit board 15 starts to pass over the flux wave the forward lower surface of the circuit board tends to deflect the peak portions of the wave so as to fill in the valley portions 67, and the complete lower surface of the circuit board 15 is covered with a moving wash of solder flux.

It has been found from experience that the wetting action of the flux starts more rapidly at the peak points 65 than would otherwise be the case if the flux wave had a uniform crest which barely touched the lower surface of the circuit board. Further it has been found that there is less tendency for flux to flow over the top of the circuit boards than would be the case if the flux wave were allowed to uniformly crest at the same level as the peak portions 65. Further, in contrast to the results obtained with a level flux wave crest, fluctuations in the average level of the flux wave are relatively unimportant between rather wide limits due to the fact that exceptionally high peak portions of the wave tend to be absorbed in the valley portions 67 and relatively low peak portions still tend to be sufficient to cause some filling in of the valley portions with resultant wetting of the complete area of the lower surface of the circuit board.

A flux wave having a uniform crest tends to overflow the circuit board if too high and cause incomplete wetting of the lower surface of the board if too low. Thus to use a level cresting wave would require relatively expensive pressure controls on pump 19 or some other device for maintaining pump speed so as to provide a relatively constant pump output pressure. Means for forming a plurality of peaks and valleys in the solder wave such as simple baffles 61 eliminate or at least minimize this problem.

Thus it can be seen that the embodiment as shown in the drawings and as herein explained fulfills the aims and objects of the invention. Other structures may also be utilized. For example, fluid pressure for forming the flux wave may be provided by any means for causing flow of the fluid flux. Further the particular type of orifice and baffles shown may be replaced by other structures suitable for forming a wave shape similar to that shown in FIG. 2. Also under certain conditions it may prove desirable to allow the circuit boards to pass over the flux wave at an angle to the longitudinal axes of the flux peaks and valleys.

While there has been shown and described what is at present considered a preferred embodiment of the present invention, it will be obvious to those skilled in the art that various changes and modifications may be made therein without departing from the invention as defined in the appended claims.

Having thus described my invention, I claim:

1. In a device for applying fluid solder flux to the under side of a circuit board having depending component terminals the combination comprising means for forming a continuous flux wave having a plurality of peaks and valleys spaced across a given width at an average level, with the longitudinal axes of said valleys lying parallel to a given direction, and means for moving circuit boards of substantially said given width along a horizontal plane substantially at said average level in said given direction.

2. In a device for applying fluid solder flux to the under side of a circuit board having depending component terminals the combination comprising means for forming a continuous flux wave having a plurality of peaks and valleys spaced across a given width at an average level with the longitudinal axes of the flux wave valleys lying parallel to each other, and means for supporting circuit boards of substantially said given width along a horizontal plane substantially at said given level for relative movement between said circuit boards and said flux wave along the longitudinal axes of the flux wave valleys.

3. In a process for applying fluid solder flux to the under side of a circuit board having depending component terminals the steps of forming a continuous flux wave having a plurality of peaks and valleys spaced across a given width at an average level with the longitudinal axes of said valleys lying parallel to a given direction, and moving circuit boards of substantially said given width along a horizontal plane substantially at said given level in said given direction.

References Cited in the file of this patent

UNITED STATES PATENTS

| | | |
|---|---|---|
| 812,955 | Sharp | Feb. 20, 1906 |
| 2,529,699 | Loch | Nov. 14, 1950 |
| 2,869,497 | Lehner | Jan. 20, 1959 |
| 2,870,532 | Young | Jan. 27, 1959 |
| 2,895,683 | Dvorak | July 21, 1959 |

FOREIGN PATENTS

| | | |
|---|---|---|
| 798,454 | Great Britain | July 23, 1958 |
| 798,701 | Great Britain | July 23, 1958 |